United States Patent Office 3,008,422
Patented Nov. 14, 1961

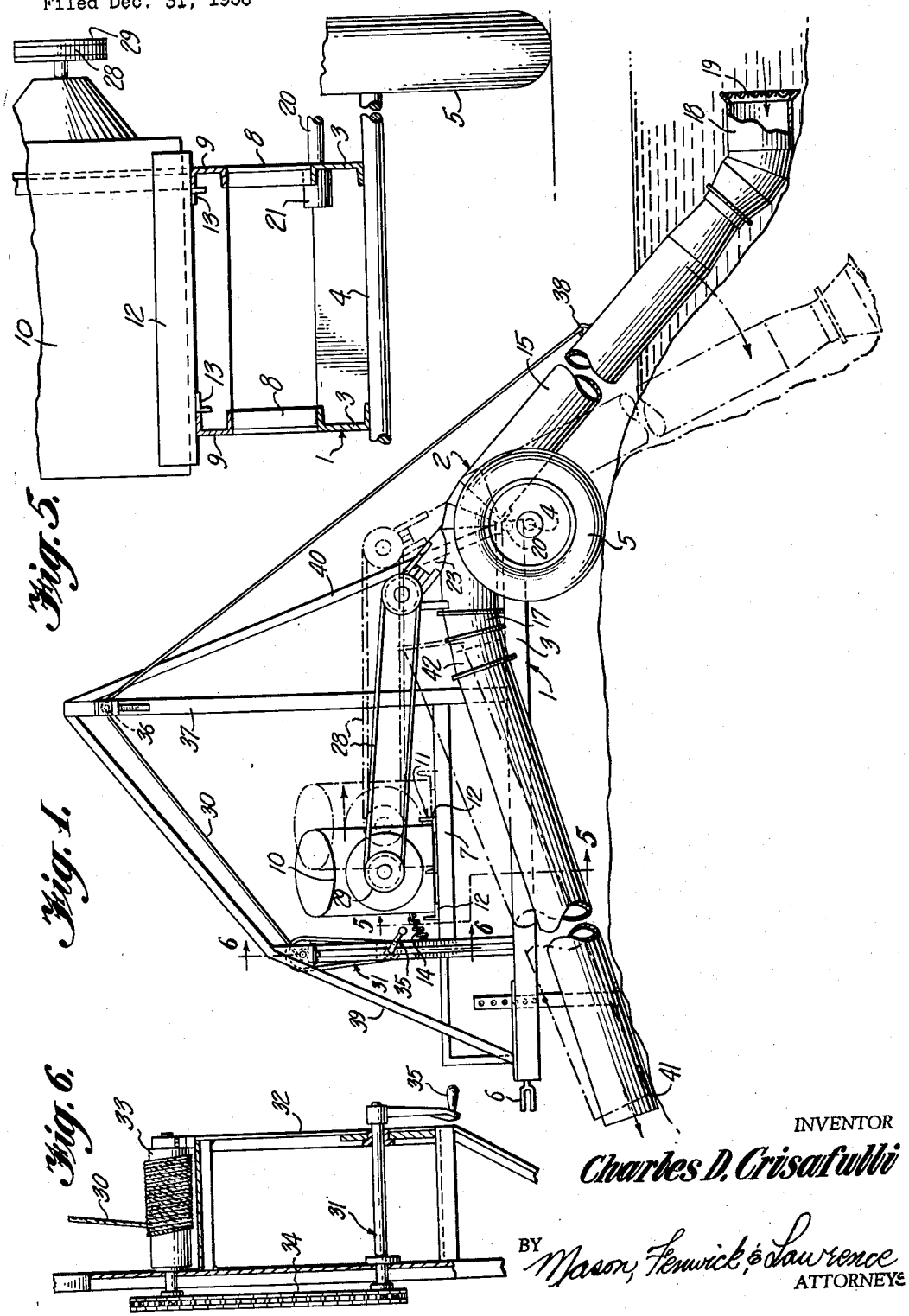

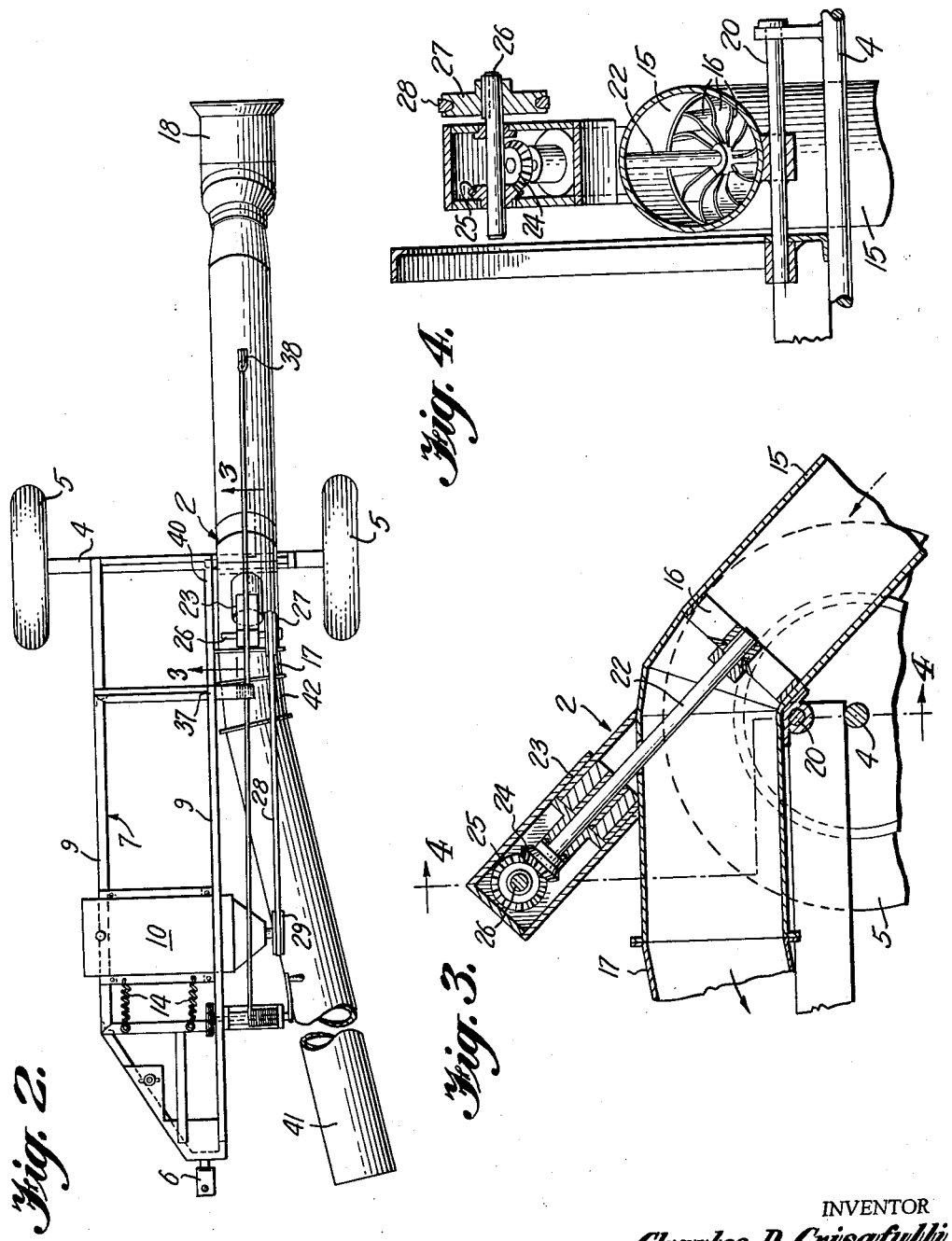

3,008,422
MOBILE PUMPS
Charles D. Crisafulli, Rte. 2, Box 485, Merritt Island, Fla.
Filed Dec. 31, 1958, Ser. No. 784,309
5 Claims. (Cl. 103—87)

This invention relates to pump structures, and particularly to pump structures mounted so as to be mobile for transportation to irrigation canals, ponds, lakes, etc. for pumping from the body of water and discharging at a desired place.

Equipment of this general type has been proposed, but considerable difficulty has been encountered in providing a pump structure which would be capable of adjustment to reach various depths in a canal, or other body of water, so as to be capable of operation at various water levels. One of the principal difficulties has been to provide such structure wherein the adjustment necessary can be made without affecting the pump drive.

The principal object of the invention is to provide a mobile pump unit capable of operation within a 90° vertical angle of adjustment and discharging in a desired area during the complete adjustment range.

Another object of the invention is to provide a pump of this nature wherein the adjustment can be made and the drive for the pump will automatically compensate for the adjustment.

A further object is the provision of an adjustable pump structure including a belt drive in which the full adjustment of the pump can be made without causing the belt drive to twist.

A further object is to provide a pump mounted upon a trailer with means to permit the pump and intake structure to be raised to horizontal position for transportation, and wherein the over-all width will be within the maximum permitted for highway travel.

A still further object is to provide a mobile pump unit which will do the work of several stationary units and will be capable of setting up for use or taking down for transportation in approximately five minutes.

Other objects of the invention will become apparent from the following description of one practical embodiment thereof, when taken in conjunction with the drawings which accompany, and form part of, this specification.

In the drawings:

FIGURE 1 is a side view of a mobile pump unit embodying the principles of the present invention, set up for pumping operation;

FIGURE 2 is a top plan view of the structure shown in FIGURE 1;

FIGURE 3 is a vertical section through a part of the pump structure, its mounting and drive, and is taken on the line 3—3 of FIGURE 2;

FIGURE 4 is a sectional view taken at right angles to FIGURE 3 and on the line 4—4 of FIGURE 3;

FIGURE 5 is a vertical transverse section through the motor mount and the trailer frame, and is taken on the line 5—5 of FIGURE 1; and FIGURE 6 is a transverse section illustrating the pump raising cable winch, taken on the line 6—6 of FIGURE 1.

In general, the invention includes a trailer with a conduit type pump mounted upon a pivot projecting from the trailer side to position the pump conduit parallel to the trailer frame and capable of vertical angular adjustment. A power plant is movable supported on the trailer and automatically compensates for adjustment of the pump angle. A discharge pipe is adjustably and releasably coupled to the pump so that it can be removed for transportation and adjusted when in use for proper discharge.

Referring to the drawings in detail, there is shown a trailer 1 having a pump unit 2 pivotally connected to the side.

The trailer can be of any suitable construction, but should be capable of supporting an engine to drive the pump, a winch for adjusting the pump and have provision for mounting the pump at the side. The trailer with the pump mounted should be so proportioned that the over-all width will be less than the normal span of the wheels of a highway vehicle.

The trailer shown consists of a channel iron frame 3 mounted upon an axle 4 carrying ground wheels 5. A hitch 6 is fixed to the front of the frame. An auxiliary frame, or motor bed, 7 is provided above the main frame. This is simply a rectangular frame supported upon posts 8 and having side rails 9. An internal combustion engine 10 will be mounted upon any suitable carriage 11, which is shown as comprising angle supports 12 for the motor which are slidable on the side rails 9 and joined by bridge members 13 positioned to lie between the rails 9 and prevent side movement of the motor carriage. The motor may be biased toward one end of the frame if desired, as, for example, by springs 14, or a counterbalance weight may be used, or the motor may be simply adjustable along the rails with suitable means for holding it in adjusted position.

The pump is in the form of an elongated conduit, or tube, 15 with an impeller 16 mounted within it. The tube 15, which forms a housing for the pump and an inlet conduit for liquid being pumped, may be of any desired length. The upper and lower ends of the tube are curved, or fitted with necessary elbows, etc., to provide upper and lower oppositely extending outlet and inlet ends 17 and 18, respectively. The inlet end of the tube may be covered with a screen, or grate, 19 to prevent trash or other foreign matter which might damage the pump from entering.

This pump unit is pivotally connected to the trailer by means of a pivot shaft 20, supported by the trailer and passing through a boss 21 on the underside of the tube 15 at the elbow or bend between the main tube section and the upper inlet section 18.

The pump impeller 16 will be driven by a shaft 22, which extends axially of the elongated tube 15 and projects outwardly through the curved upper end of the tube, as clearly seen in FIGURE 3. The projecting end of the shaft is journalled and housed in a tubular housing 23. Shaft 22 carries a bevel gear 24 at its end which meshes with a second bevel gear 25, mounted on a shaft 26 also journalled in housing 23 and extending at right angles to shaft 22 and through the housing wall to mount a drive pulley 27. Pulley 27 will be above the pump and parallel to a vertical plane which includes the axis of the pump tube. Due to the fact that the pivot for the pump is normal to the vertical plane of drive pulley 27, that pulley will remain in the same plane through the full range of adjustment of the pump. This greatly simplifies the drive. To drive the pulley 27 it is only necessary to provide a belt 28 from the pulley 27 to a pulley 29 on the shaft of the motor 10. The belt, therefore, will not become twisted or fouled during angular adjustment of the pump.

The tubular pump unit is raised and lowered by means of a cable 30 controlled by a winch 31. The winch will be mounted on a frame 32, built upon the main trailer frame and offset to the side so that the winch will be in line with the pump. As shown, the cable drum 33 of the winch is mounted some distance above the trailer frame and a chain drive 34 is employed from the drum to an operating handle 35. Cable 30 extends from the cable drum over a pulley 36 on a mast 37, and is attached to the tube 15 at a point 38 removed from the pivot 20 so as to provide the necessary leverage. Mast 37 will be connected to the trailer frame and may be braced in any suitable manner, such as by brace members 39 and 40.

When the pump is in use, a discharge pipe 41 will be coupled to the outlet end of the pump unit. The discharge pipe may be coupled to the pump unit through suitable elbows, or other needed fittings, such as at 42. The connection to the pump unit will be made by slipping the end of the discharge pipe, or the elbow or adapter as the case may be, over the outlet end of the pump unit. This will provide a quick connection, and one that will permit the angle of the discharge pipe to be changed as needed simply by rotating the discharge pipe and elbow.

With the device as above described, pumping from a canal, lake or reservoir will be very simple. The trailer can be backed to the water's edge and the winch operated to lower the pump unit about its pivot, so that the inlet will be at the proper depth to be fully submerged. As the pump unit swings about its pivot, the drive pulley 27 will move bodily, due to the fact that it is spaced from the pump unit pivot and will swing about it. This would change the distance between the pulley 27 and the motor pulley if it were not for the fact that the motor may move to adjust for the pulley movement. This will keep the drive belt taut at all times. As pointed out above, the two pulleys will remain in the same plane and there will be no belt twisting or shifting. When the pump is adjusted, the discharge pipe will be put in place and rotated to assume the desired angle required by the particular terrain. When pumping is finished, the discharge pipe can be removed, the winch operated to raise the pump unit to horizontal position and the device is then ready for transportation on the road. It requires but a matter of minutes to set the device up for use or to prepare it for transportation.

While in the above one practical embodiment of the invention has been disclosed, it will be understood that the details of construction shown and described are merely by way of example, and the invention may take other forms within the scope of the appended claims.

What is claimed is:

1. A mobile pump comprising, a wheeled trailer, an elongated tubular conduit at one side of the trailer and extending lengthwise of the trailer and pivotally connected to the trailer upon a pivot having its axis horizontal and normal to the axis of the tubular conduit to permit tilting of the conduit in a vertical plane, an impeller mounted in the conduit and having a shaft extending axially of the conduit, a shaft at right angles to the axis of the conduit and normal to the plane of tilt of the conduit and having at least one end lying outside the conduit, gears drivingly interconnecting said shaft, a pulley on the end of the shaft outside the conduit, a power plant mounted on the trailer for sliding movement thereon along a path parallel to the axis of the conduit, a pulley on said power plant in the vertical plane of the first-mentioned pulley, a belt connecting said pulleys, and means yieldably urging the power plant away from the first mentioned pulley whereby the power plant can compensate for conduit tilt and the belt can be maintained tight and straight at all angles of tilt of the conduit.

2. A mobile pump is claimed in claim 1, and means to tilt said conduit about its pivotal connection with the trailer.

3. A mobile pump as claimed in claim 1 wherein a discharge pipe is removably connected to the conduit and angularly adjustable thereon.

4. A mobile pump comprising, a wheeled trailer, an elongated tubular conduit at one side of the trailer extending lengthwise of the trailer, the conduit being generally inverted V-shaped and lying in a vertical plane, a pivot pin in the apex angle of the V-shaped conduit lying normal to the plane of the conduit and pivotally connecting the conduit to the trailer, a pump mounted in one leg of the V-shaped conduit having a shaft extending axially of the leg of the conduit in which the pump is mounted, a drive shaft at right angles to the pump shaft having at least one end lying outside the conduit, gearing interconnecting the pump and drive shaft, a pulley on the end of the drive shaft outside the conduit lying in a plane parallel to the vertical plane of the conduit, a power plant mounted on the trailer for sliding movement thereon along a path parallel to the vertical plane of the conduit, a pulley on the power plant in the vertical plane of the first-mentioned pulley, a belt connecting the pulleys, and means yieldably urging the power plant along its slide path in a direction away from the first-mentioned pulley, whereby the power plant will move in accordance with bodily movement of the first-mentioned pulley as the conduit is tilted about its pivot pin to automatically maintain the belt under predetermined tension.

5. A mobile pump as claimed in claim 4 wherein one leg of the V-shaped conduit includes a rotatable elbow, and a discharge pipe connectible to the elbow to permit discharge of pumped material at a point spaced horizontally from the vertical plane of the conduit when the elbow is rotated.

References Cited in the file of this patent

UNITED STATES PATENTS

| | | |
|---|---|---|
| 2,214,677 | North | Sept. 10, 1940 |
| 2,583,082 | Bobrowski | Jan. 22, 1952 |
| 2,664,052 | Schmidt | Dec. 29, 1953 |
| 2,744,465 | Springer | May 8, 1956 |